United States Patent [19]

Tylisz et al.

[11] Patent Number: 5,085,152
[45] Date of Patent: Feb. 4, 1992

[54] WELL CAR CROSSBEARER SIDE CONNECTION

[75] Inventors: Eugene R. Tylisz, Michigan City; Phillip G. Przybylinski, Schererville, both of Ind.

[73] Assignee: Trinity Industries, Dallas, Tex.

[21] Appl. No.: 575,414

[22] Filed: Aug. 29, 1990

Related U.S. Application Data

[63] Continuation-in-part of Ser. No. 440,903, Nov. 22, 1989, Pat. No. 5,000,633, and a continuation-in-part of Ser. No. 460,576, Jan. 3, 1990, Pat. No. 5,017,066.

[51] Int. Cl.$^5$ ............................................. B61D 3/20
[52] U.S. Cl. ................................. 105/419; 105/411; 105/404
[58] Field of Search .............. 105/404, 411, 413, 418, 105/419, 422; 410/52, 54

[56] References Cited

U.S. PATENT DOCUMENTS

2,255,900 9/1941 Schlessinger ..................... 105/411
4,782,762 11/1988 Johnston et al. .................. 105/411
4,889,055 12/1989 Jamrozy et al. .................... 105/419

Primary Examiner—Robert J. Oberleitner
Assistant Examiner—Mark T. Le
Attorney, Agent, or Firm—Myers & Assoc.

[57] ABSTRACT

A railway well car for carrying containers of selected alternative lengths has a center crossbearer having a support for supporting the inner corners of two tandem containers, the support having side connections of sandwich construction with a flanged portion of a side sill, the sandwich construction being formed of inner and outer "L" shaped brackets disposed above and inside and below and outside a side sill of the car, respectively, and being fixed to the sill at respective upper and lower horizontal portions, the crossbearer being a tube formed of a lower channel closed by a top plate and the plate being at the level of the inner bracket, and the crossbearer extending from one side wall to a bracket on the opposite wall, and the inner bracket being wider than the outer bracket for improving distribution of loads to the side sills and the side walls.

14 Claims, 6 Drawing Sheets

WELL CAR CROSSBEARER SIDE CONNECTION

BACKGROUND OF THE INVENTION

This application is continuation in part of application Ser. No. 07/440,903 filed Nov. 22, 1989, now U.S. Pat. No. 5,000,633, and application Ser. No. 07/460,576 filed Jan. 3, 1990, now U.S. Pat No. 5,017,066.

FIELD OF THE INVENTION

Invention relates to fabricated railway rail cars and more particularly to the connection of containers-supporting crossbearers to the side wall structures to strengthen the same to take advantage of materials and the geometry of the structures with respect to the loads imposed thereon.

DESCRIPTION OF RELATED ART

This invention relates to structures utilized in cars arranged in articulated fashion as shown in U.S. Pat. No. 4,782,762, issued Nov. 8, 1988, which is commonly owned with this application, and which is incorporated by reference herein.

Specifically addressing structures supporting loads in rail cars, various prior art patents showing the use of a single substantially L shaped reinforcement coacting with an L shaped or angle section structural member to strengthen and reinforce said structural member to withstand loads.

Gutridge, U.S. Pat. No. 3,319,583, issued May 16, 1967, shows a skeletal container carrying car adapted to carry double stacked containers in a central well having perpendicular interior walls or flanges on side and floor beam girders with exterior, substantially vertical and substantially horizontal reinforcing flanges on said beams or girders.

Jwuc, U.S. Pat. No. 4,452,147, issued June 5, 1984, shows angled members for supporting containers coacting with horizontal cross ties and vertical cross tie side supports.

Pavlick, U.S. Pat. No. 4,524,699, issued June 25, 1985, shows an angled side sill with vertical and horizontal portions being reinforced by a second angle member with a horizontal and vertical portion, the second angle supporting a horizontal girder or beam on which semitrailers are supported in a well.

Billingsley, U.S. Pat. No. 4,563,957, issued Jan. 14, 1986, uses a casting having in section a vertically extending leg or base portion and a horizontally extending arm or body portion which reinforce side and floor plates of a railroad car, respectively.

In addition, certain recent co-pending patents deal with structures showing the expedient of strengthening one angle section member by doubling up with a second angle member. U.S. Pat. Nos. 4,771,706, 4,876,968, and 4,909,157 describe castings as superior to fabricated or welded members while U.S. Pat. No. 4,807,722, although having common inventors and claiming co-pending status, emphasizes superiority of angle section members reinforcing the angled portion of an inverted T-section member in an embodiment having relative ease of fabrication as a feature equally important as strength.

SUMMARY OF THE INVENTION

A railroad car is supported by trucks and in the preferred embodiment is coupled through articulated joints with a series of other cars or platforms. The individual cars have side walls interconnecting to end portions for each car, the walls and end portions forming a container receiving well. The size of the well may be selected to accommodate double stacked containers in combinations of one long (40, 45, 48 or 53 feet) bottom container or two short (20 feet) standardized containers on crossbearer and welded sandwich side connection members connected to the side sills and supporting the container support castings. Additional cross braces provide additional strength and stiffness to the structure also extending from side wall to side wall and provide auxiliary support for distorted container floors. However, the cross braces and longitudinal stringers provide an open grid defining the bottom of the well, rather than a floor.

The side walls are formed of exterior angled side sheets and are joined to a bottom Z-shaped side sill and a top chord. Interior vertical side plates reinforce the side walls at the crossbearer positions. The crossbearers and crossbearer side connections are joined to the lower inwardly projecting flanges of the side sill. Top flanges of the side sill are carried internal of a trapezoidal box section structure formed by the side sheet and side sill.

The side connection includes an angle, specifically a substantially L-shaped member having one portion corresponding to the vertical web of the side sill and a second portion to the bottom inwardly directed flange of the side sill. This portion then extending joins with the crossbearer. The connection is paired with a similar structure on the opposite side wall similarly supporting the opposite end of the crossbearer. An exterior support extends from the side sheet along and joined to the vertical web of the side sill and further extending inwardly joined to and below the bottom flange of the side sill, the reinforcing member and support forming a sandwich or laminated structure with the side sill for supporting the container.

An internal angled bracing plate extends in a trapezoidal area defined by the brace, side sheet and side sill being downwardly and inwardly angled to better support the loads created by an internally placed container in the well car, especially as through the Z-section side sill. An internal vertical brace provides additional strength in a vertical plane.

DESCRIPTION OF THE PREFERRED EMBODIMENT

Figure 1:
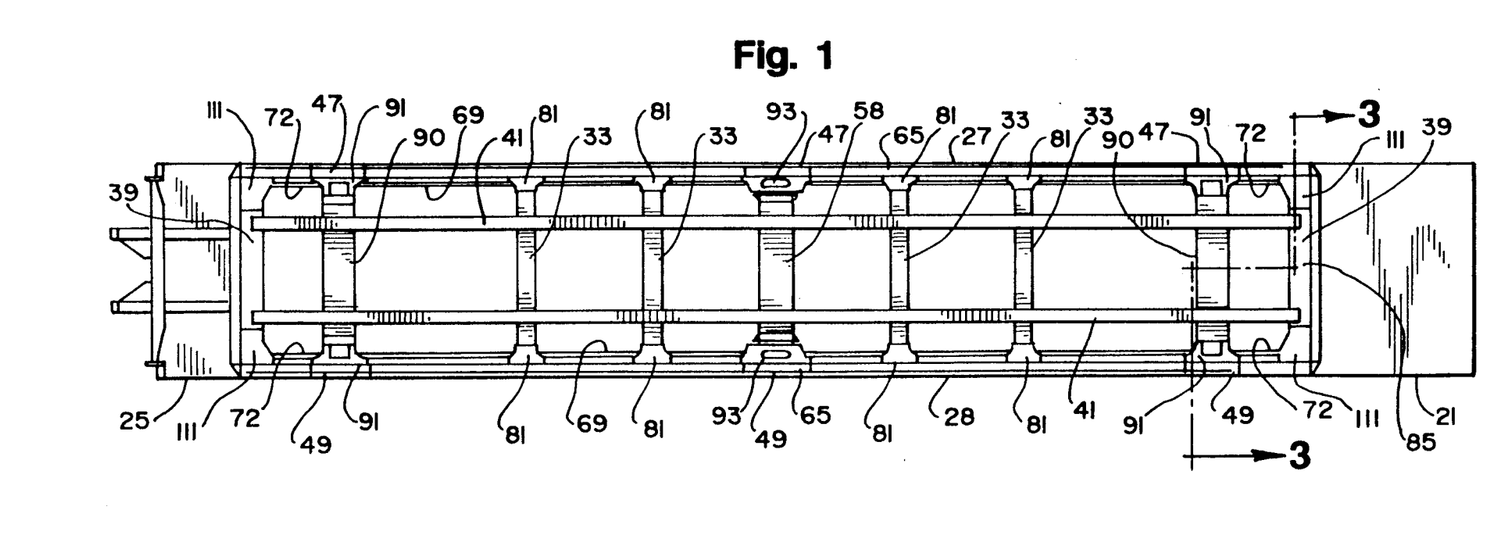
FIG. 1 is a top plan view of a railway car with the invention.

FIG. 1 is a top plan view of one car or load carrying platform, included in the preferred embodiment in a train of articulated cars, as discussed in U.S. Pat. No. 4,782,762, incorporated by reference herein. End structures 21, 25 include couplers which are arranged in the preferred embodiment as described in the aforesaid patent. Adjacent end structures 21, 25 are well end structures, generally designated 85, comprising beams 39 reinforced by corner reinforcing members 111. In the preferred embodiment the length of the well is such as to accommodate a container 48 feet long. Side structures 27 and 29, extend between and connect the end structures 21 and 25. The top of the side structures comprises a top chord 65 in the preferred embodiment an inverted channel member. Also visible in FIG. 1 is a flange of the side sill 69. The corner reinforcement member 111 connects the end beam 39 between the side walls 27 and 28 generally and specifically interconnects the members at the side sills 69. In the preferred embodiment all these elements are welded together to form a unit.

Spaced inward from the end structures 21 and 25 are intermediate container supporting crossbearers or beams 90. These are spaced at a position with centers aligned for the corner castings of a 40 feet long shipping container and longer containers having support castings with the same centers as the 40 feet long container corner castings. Side connection interior brackets 91 interconnect and reinforce the connection between the opposed side walls 27 and 28, and specifically sills 69.

Center crossbearer 58 is centered lengthwise the well and adapted to support the interior pairs of corners of 20 feet containers, the remote pairs of corner castings being supported by the intermediate crossbearers 90. The center crossbearers are reinforced by side connection interior brackets 93.

Shoes 47 and 49 are mounted on the top chords 65 in association with each crossbearer. These shoes provide for alignment of containers in particular when being loaded in the well.

Intermediate cross braces 33 are spaced between the main container supporting crossbearer and side connections 90, 58, to maintain the structural integrity of the side wall 27, 28, and end structure 21, 25, car framework. These are additionally reinforced by side connection interior brackets 81. Longitudinal beams 41 span the length of the well extending from beams 39 across crossbearers 90, 33 and 58, to the opposite end 39. The crossbearer, brace and longitudinal beam arrangements forms an open grid further improving the structural integrity of the car as a whole and providing support of container floors if ruptured, buckled or otherwise distorted.

Figure 2:
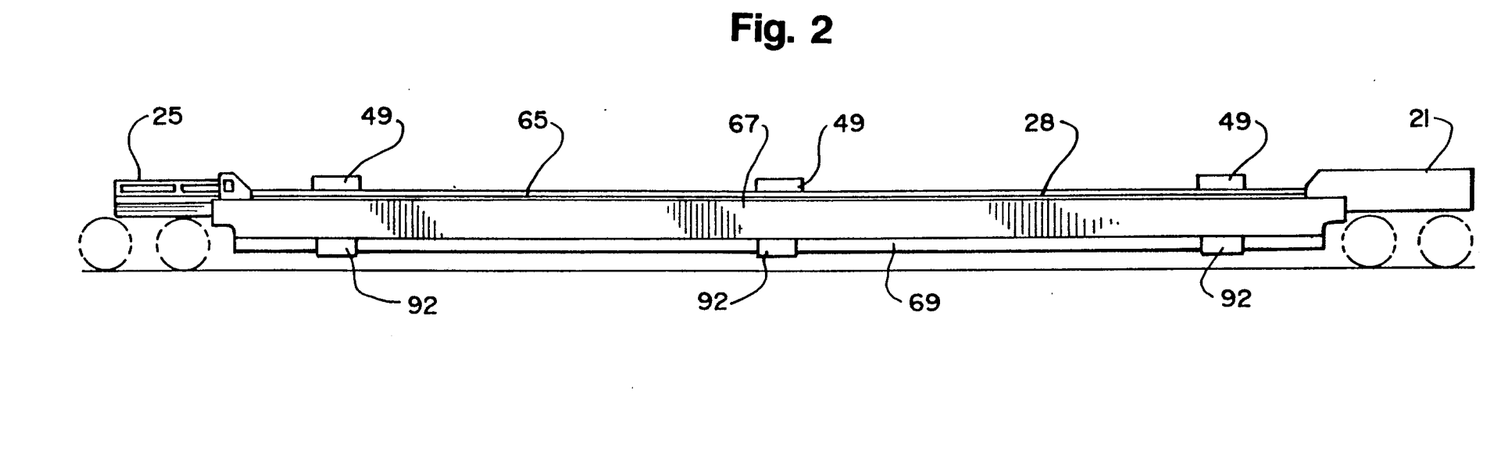
FIG. 2 is a side elevational view of a railway car with the invention.

FIG. 2 is a side elevational view of the car shown in FIG. 1. Side connection exterior enforcements 92 are shown extending exterior and below side sill 69 which is in turn affixed to side sheet 67. A top chord 65 of side wall 28 are mounted shoes 49 in association with the crossbearers as previously described.

Figure 3:
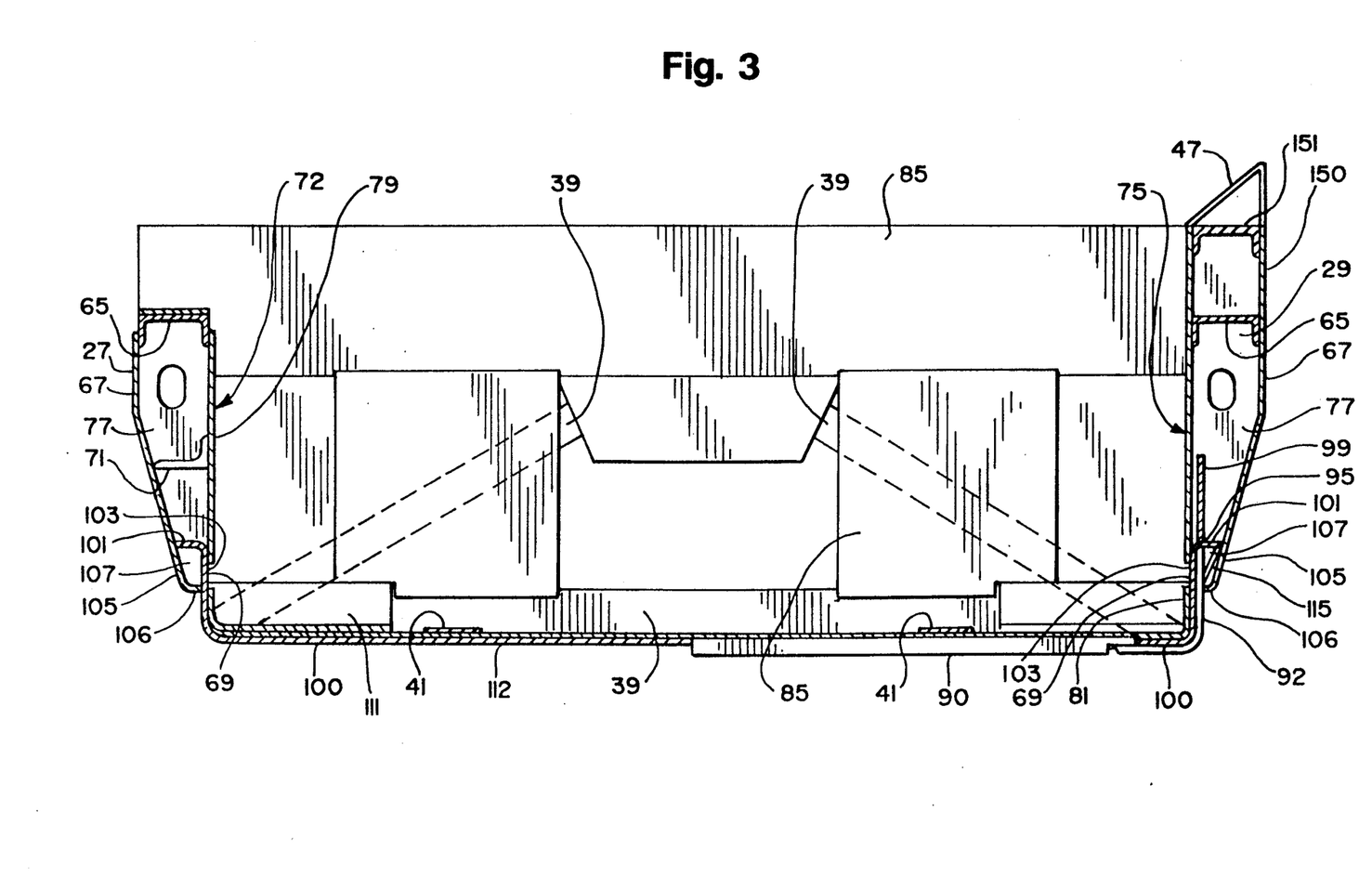
FIG. 3 is a sectional view looking toward the end of the car.

FIG. 3 shows a sectional view of the railroad car taken along a staggered line 3—3 of FIG. 1. This view shows both the section of the intermediate crossbearer 90 and the end wall transverse beam 39 with their respective brackets 81, 91.

The left portion of FIG. 3 shows the side past structure 27 near the end structure 85. Visible in this view is top chord 65, side sheet 67, side plate 72 and side sill 69. Corner reinforcement 111 and external L-shaped bracket 92 which are laminated to and sandwich side sill 69. Side sill 69 has a bottom flange 100 extending inwardly from the side structure 27 into and defining, in part, a floor of the well. Side sill top flange 101 extends outwardly and is captured within the structure defined by the side sheet 67 and a plate reinforcement 72 at this section of the car. The joint between the side sheet 67 and the side sill 69, at the lower portion of the sheet 67 (as may be seen with respect to the analogous structure at the right side of FIG. 3, FIG. 6 and FIG. 9), includes a bottom web portion 105 and an inwardly extending flange. From the joint with the web 105, side sill flange 101 extends inwardly and the side sill 69 bends downwardly substantially vertically into web 103, further continuing downwardly thence bending continuing inwardly into bottom flange 100. The structure of the elements 105, 106, 101, 103 defines a trapezoidal box section portion.

Additional internal reinforcing of the side wall is accomplished at the places where the respective crossbearers 39, 90 are located including a transversely oriented internal stiffening plate 77. An additional reinforcing angle 71 may be located near the point where side structure 27 connects to end structure 85.

Beam 39, which may comprise an angle section member, is in the preferred embodiment reinforced by additional transverse plate 112 to provide added strength.

The intermediate crossbearers 90 being spaced away from the end structures 85 have a modified reinforcing structure. L-shaped angle bracket 81 has the L-shaped section analogous to the vertical and transversely oriented portions of corner brace 111 (FIG. 3). Additional reinforcing is provided by the second external bracket 92. Bracket 81 and 92 are placed so as to sandwich vertical web 103 and horizontal flange 100 of the side sill and are welded at the points where the members contact. Owing to the geometry of the side connection and the desire to take advantage of the properties of the laminated or sandwiched hanger construction, the three members are not welded in certain areas at the corners thereof, thereby departing from the prior art solid structures.

Additional reinforcing of side structure 29 is provided by web or plate 77 as previously described. In addition side plate 75 is mounted interior the side sheet 67. Further the trapezoidal box section 107 is reinforced by angle plate 115. Exterior bracket 92 extends upward and is contained in part within the trapezoidal box section 107, but terminates in a beveled top portion 95, taking advantage of an effectively longer lever arm of the vertical portion of bracket 92 while permitting the longer member to extend in a manner non-adjacent web 103 of side sill 69. The bevel further provides clearance and improved fitting as against the bend from inwardly extending flange 101 merging into downwardly extending web 103. Angle plate 115 therefore extends upwardly and outwardly from member 92 (FIG. 6) interconnecting it with flange 101 near the origin of flange 101 adjacent side sheet bottom portion or face 105 portions 92, 101, and 115 define a triangular section. The entire cross bearer side connection and reinforced side wall structure at this point in the car forms a unitary container support.

In this sectional view longitudinal beams 41 are also evident. In the preferred embodiment, side wall 29 is extended upwardly as a continuous side wall member 150, with an additional inverted channel member 151 above chord 65. On top of channel 151 is mounted shoe 47. It has been determined that extending the complete side wall assembly upward to support shoe 47 increasing the strength of the car at critical points. In addition the shoe projects upwardly protecting the side from damage during the loading of the containers. Commonly assigned co-pending application Ser. Nos. 07/440,903 (U.S. Pat. No. 5,000,633) and 07/460,576 (U.S. Pat. No. 5,017,066) are incorporated herein by reference describing aspects of the shoe and in particular adjustable features therein.

Figure 4:
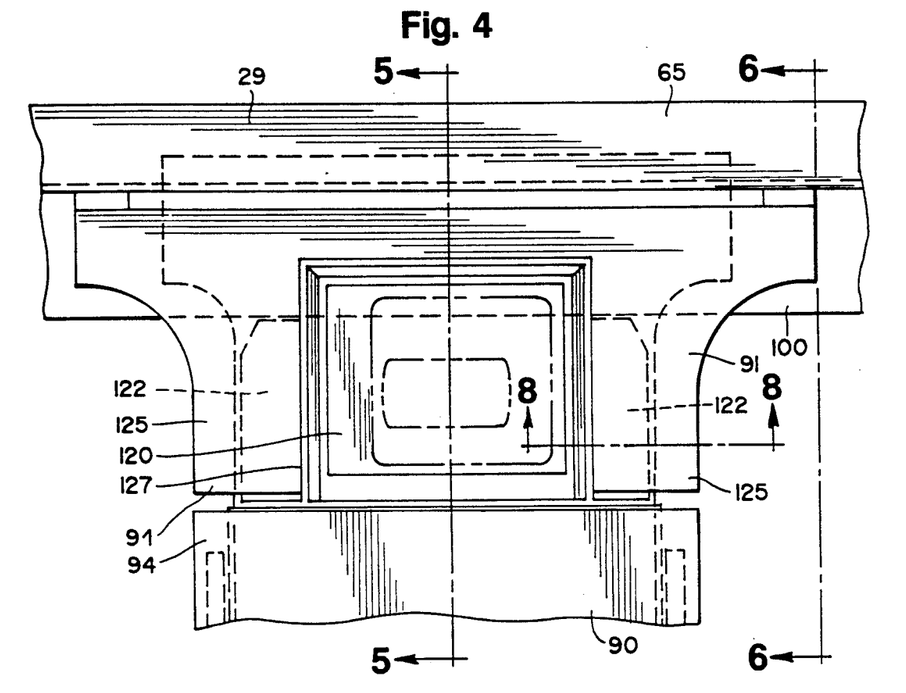
FIG. 4 is a top plan view of the crossbearer side connection.
Figure 6:
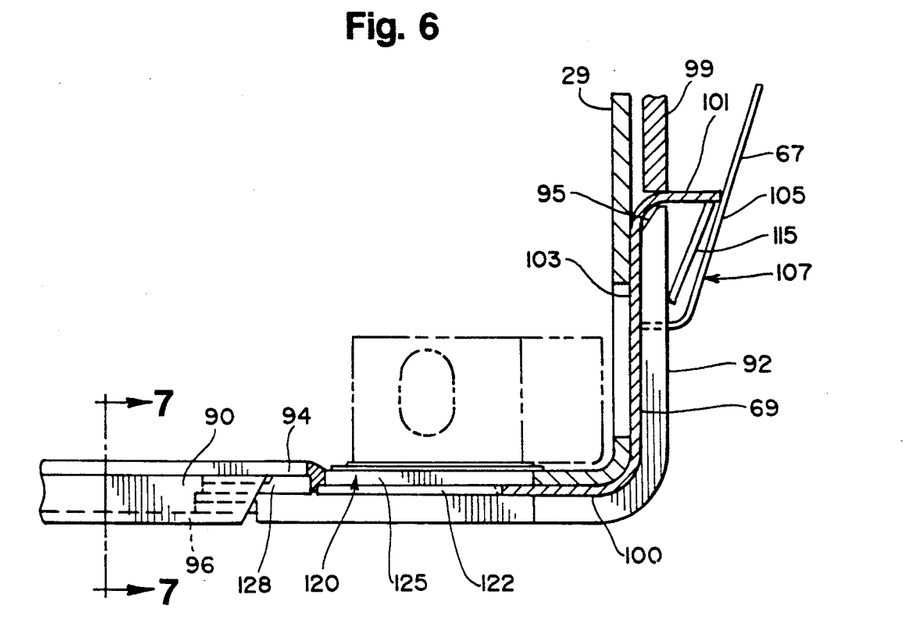
FIG. 6 is a sectional view of the side connection.
Figure 7:
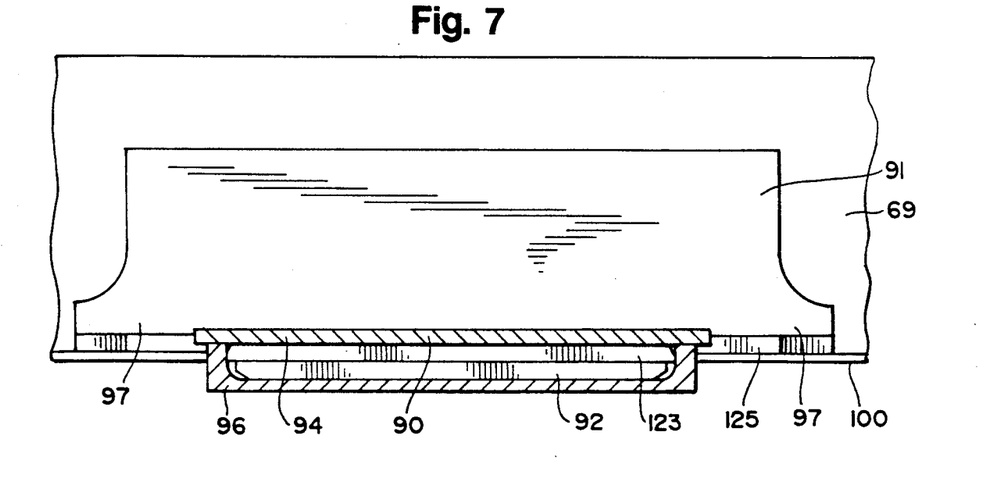
FIG. 7 is a sectional view of looking transversely.

FIG. 4 is a top plan view of an intermediate crossbearer side connection. In FIGS. 4 and 6 the side connection interior bracket 91 includes two filler plates 122 extending inwardly toward crossbearer 90 defining the recess or gap 127 between them. This arrangement provides adequate strengthening while maintaining and permitting an arrangement at the requisite height of container support 120. Elements described in connection with additional figures are shown in phantom.

Figure 5:
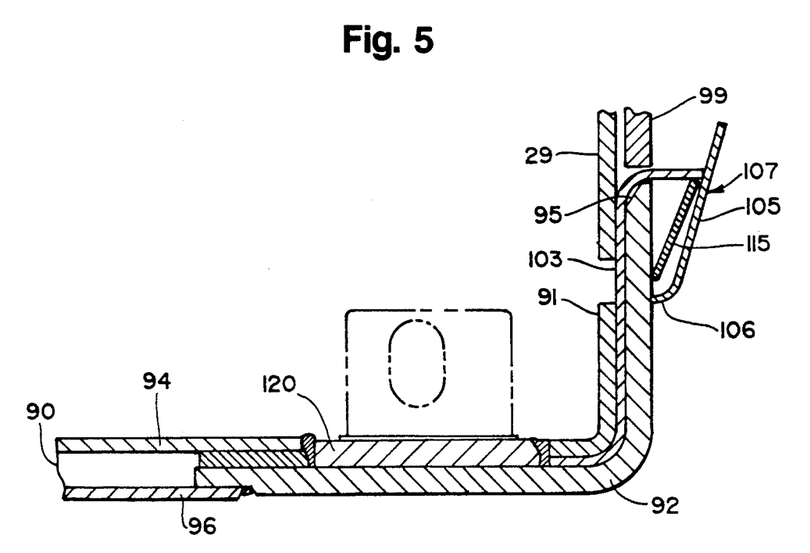
FIG. 5 is a sectional view of the crossbearer side connection.

FIG. 5 shows a typical container corner casting in position on support 120 which is located inwardly spaced from wall 29 generally and plate 95 specifically. In the case of 8 feet wide standardized containers while permitting clearance for wider containers as shown in FIG. 6. The central portion of support 120 rests directly on the member or bracket 92. Further visible in this sectional view are the top crossbearer plate 94 and crossbearer channel 96 which are interconnected through welding in the preferred embodiment to form crossbearer element 90. Similar construction is used for center crossbearer assembly 58.

FIG. 6 shows a sectional view taken at line 6—6 of FIG. 4, including the previously described side wall or side structure 29 and the previously mentioned elements of the trapezoidal box section 107. Shown in phantom is a corner casting of the standardized 8½ feet container still aligned with support 120 while having sufficient clearance to side wall 29 and the opposite side wall 27 (FIG. 3). Arm 125 extends across substantially the entire horizontal portion of support 92 to its joint with crossbearer 90 further showing an additional spacer 123, itself sandwiched with the horizontal portion 92 between plate 94 and channel 96. At the bended member 91 flanges or ears 97 extend parallel to side sill 69. Crossbearer 90, plate 94 and channel 96 are shown in section.

Figure 8:
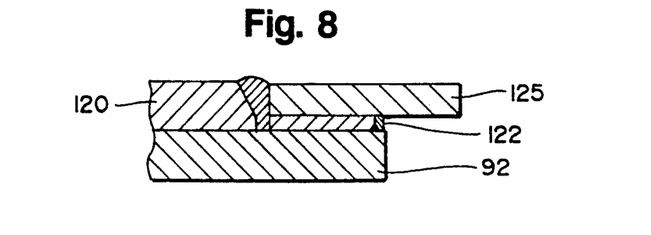
FIG. 8 is a sectional view of a portion of a side connection looking outwardly.

FIG. 8 shows a detail of the weld with support 120 resting directly on support 92 with internal bracket leg 125 supported on spacer 122 forming a welded sandwich.

Figure 9:
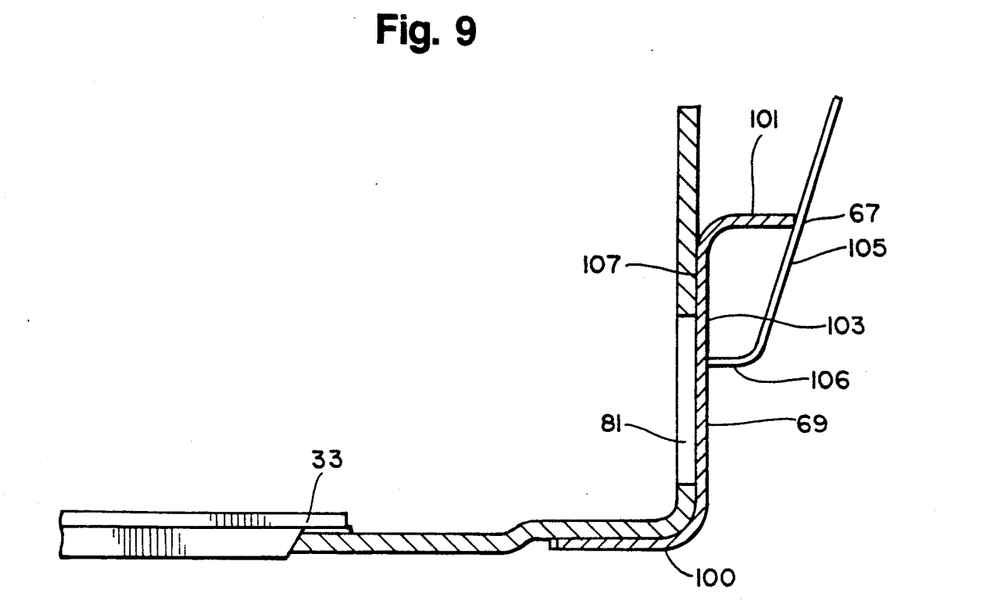
FIG. 9 is a sectional view of a secondary cross brace and side connection.

FIG. 9 shows an intermediate crossbeam 33 and crossbeam connection member 81 spaced inward the container corner casting supporting crossbearers 90 and 58. These secondary members in position, particularly as shown in FIG. 1, contribute to the structural integrity of the car. Notwithstanding, the members directly contribute to the maintenance of the integrity of longitudinal members 41 and provide support for secondary loads, analogous to FIG. 9 has been used in lieu of a center crossbearer and bracket assembly 58, 93 more than one year prior to the date of this application, however, the overall structure includes neither the sandwich, external support member 92, internal angle plate 115 or side wall internal vertical bracket 99 of the instant invention, nor the overall combination of supports and structure resulting in the instant novel car.

Figure 10:
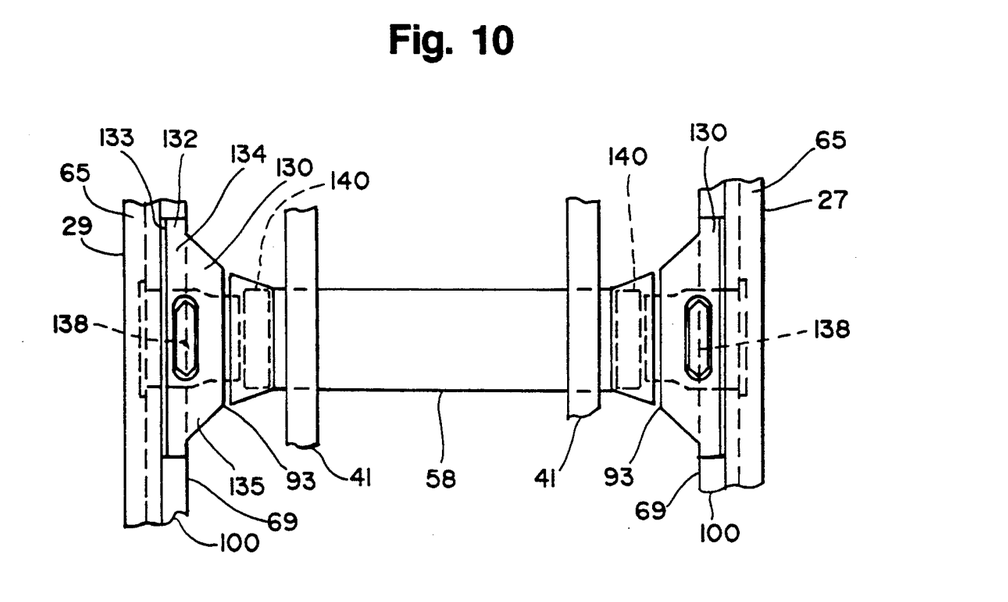
FIG. 10 is a fragmentary top view of the center crossbearer assembly.

FIG. 10 is a fragmentary top plan view at the center crossbearer 58 location. The center crossbearer 58 side connections generally indicated with reference numeral 93 extends between side structures 27 and 29. Describing the center crossbearer connection in greater detail, side connection 93 comprises a main angle brace 130 with an angled portion 132, itself comprising a vertical flange 133 and horizontal web portion 134, in turn merging into a horizontal inwardly directed flange 135. The various portions are separately identified as they contribute different functions to the structure. Angle portion 132 mates or nests with Z-shaped side sill 69, the horizontal web portion 134 resting on the sill horizontal flange 100 and the vertical flange 133 abutting and being welded to the side sill vertical web 103. These portions spread the load to an optimal degree along the length of sill 69. Inwardly depending flange 135 is beveled to reduce in dimension (corresponding to the length of the car) from its widest point where it merges with web 134 to a narrow point at its inward most extent. Container support pad 138 is adapted to support two container corner castings corresponding to the interior corners of two 20 feet long containers within the well.

Further inward is crossbearer side connection center top cover plate 140 which provides further transition from the beveled flange 135 to the center crossbearer 58. The transition then from sill flange 100 is through a full-width web 134 through approximately 45 degree bevels on flange 135 to bevels on plate 140 of less than 30 degrees to crossbearer 58 normal to sill 69. This arrangement has been found to provide desirable load transmission from pads 138 on which containers are supported to side structures 27 and 29. It will further be noted in phantom, the additional portions of the sandwich structure previously described are of substantially narrower width than center angle brace 130 and plate 140, downwardly decreasing its width (aligned longitudinal the car).

FIG. 10 is a fragmentary cutaway elevation at the center crossbearer position. The various layers are respectively cut away showing the members exterior sill 69 at the left drawing and the members interior the sill at the right portion of the drawing. Side sheet 67 has inwardly angled bottom portion 105 cut away to show side sill 69, including flange 101 which extends inwardly from portion 105 to vertical web 103. In the area enclosed by flange 101 and portion 105 as previously described, brace or angle plate 115 is also cut away, thereby showing inwardly lying vertical portion of external bracket 92. Additionally, gussets 140 are welded to bracket 92 and web 103, providing additional strength thereto.

Web 103 and the right portion of bracket 92 are cut away to show center crossbearer interior 93 generally, and specifically member 130 with vertical flange 153, which is also beveled like web 134 previously described, narrowing upwardly.

Figure 11:
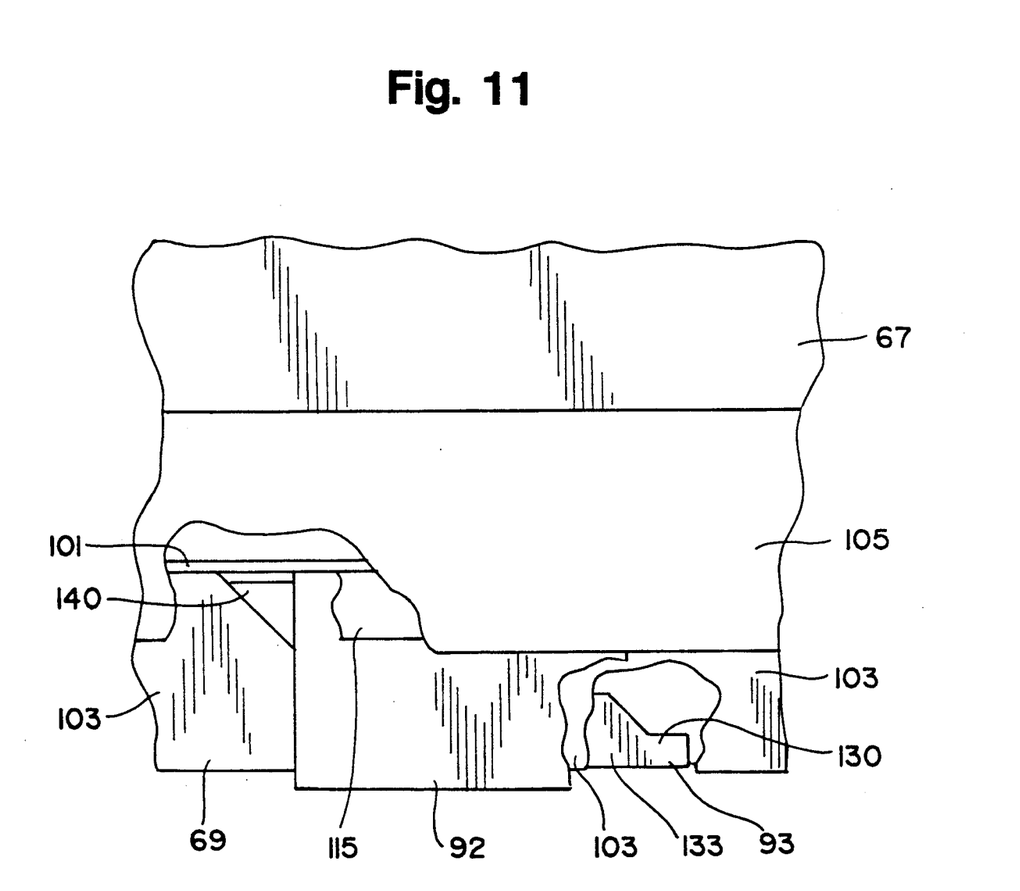
FIG. 11 is a cutaway elevational view of the center crossbearer assembly.

FIG. 11 is a fragmentary cutaway elevation at the center crossbearer position. The various layers are respectively cut away showing the members exterior sill 69 at the left drawing and the members interior the sill at the right portion of the drawing. Side sheet 67 has inwardly angled bottom portion 105 cut away to show side sill 69, including flange 101 which extends inwardly from portion 105 to vertical web 103. In the area enclosed by flange 101 and portion 105 as previously described, brace or angle plate 115 is also cut away, thereby showing inwardly lying vertical portion of external bracket 92. Additionally, gussets 140 are welded to bracket 92 and web 103, providing additional strength thereto.

Web 103 and the right portion of bracket 92 are cut away to show center crossbearer interior 93 generally, and specifically member 130 with vertical flange 153, which is also beveled like web 134 previously described, narrowing upwardly.

In accordance with the invention, we claim:

1. A railroad well car with a longitudinal and transverse axis for carrying containers of selected length comprising:
   truck supported end portions;
   side walls operatively interconnecting said end portions forming a container-receiving well, said side walls being formed with a continuous exterior side sheet extending between the end portions and having a substantially vertical top panel merging into an inwardly angled lower panel, a first chord extending the length of the top panel and spaced vertical side plates interior the side sheet defining the sides to the well;
   a Z-section side sill mounted to the bottom of each side wall with a top flange internal the side wall extending inwardly from the side sheet to the plane of the side plate, an inwardly directed bottom flange extending into the well for attachment to an associated crossbearer, a vertical web interconnecting the flanges, the top flange, lower panel and web being joined to one another to form a substantially trapezoidal section;
   an angled interior bracket with a vertical leg adjacent the side sill web and a horizontal arm adjacent to and extending inwardly further than the side sill bottom flange;
   an L-shaped exterior container supporting member with a vertical portion adjacent the side sill web extending above the lower panel and a horizontal portion adjacent to and extending inwardly further than the side sill bottom flange, triangular reinforcements flanking said vertical portion and affixed thereto and affixed to said side sill web reinforcing the vertical portion and side sill web with one another;
   said angled interior bracket having a longitudinal dimension adjacent side sill being substantially greater than the dimension in the same direction of said exterior supporting member;
   the sill, with the interior bracket and exterior member forming a container supporting laminated structure;
   an internal angled bracing plate located within each side wall trapezoidal section.

2. The invention according to claim 1; and
   said car having another bracket arranged in opposed relation to the first-mentioned bracket providing a pair therewith and
   a crossbearer extending between said pair of brackets to provide a container supporting structure.

3. The invention according to claim 2; and
   said brackets being substantially equally spaced longitudinally from each end of the car and positioning a crossbearer centrally transverse of the car;
   intermediate crossbearers spaced inwardly between said centrally positioned crossbearer and said ends and being mounted on said opposed side sills.

4. The invention according to claim 3; and
   said side walls comprising, a second chord spaced above said first chord at the top of the top panel and the top of the side plate; the chords, top panel and side plate defining a substantially rectangular space therebetween; and
   a fixed inwardly angled guide supported by said second chord for directing the loading of containers into the well.

5. A railway car having ends and side walls defining a well for carrying a plurality of shipping containers having interior opposing ends and outer ends comprising:
   each side wall including at its bottom a side sill having a lower inwardly extending flange; first support means for supporting the interior ends of containers placed in the well in tandem, said support means having a sandwich bracket construction comprising an internal "L" section bracket providing a top and inner layer of the sandwich;
   an external "L" section bracket forming a bottom and outer layer of the sandwich and also having a portion extending within the side wall;
   said brackets embracing the sill between them; and
   said internal bracket being substantially wider than the external bracket.

6. The invention according to claim 5; and
   said side sill being a "Z" section with upper and lower flange and a vertical web therebetween;
   an interior vertical side plate fixed to said web; defining the interior of said well;
   an exterior side sheet having a vertical portion,
   said sheet having a downwardly inwardly angled portion extending the length of the car and an inwardly extending flange at the bottom of the angled portion;
   the sheet flange being fixed to the external bracket and the sheet angled portion being fixed to the sill upper flange to form segments of a box section; and
   an internal brace bisecting said box section.

7. The invention according to claim 6; and
   second and third container support means being associated with the ends of the car for supporting selectively either both ends of a single container substantially extending the length of the well, or the outer ends of two containers placed in tandem in the well.

8. The invention according to claim 7; and
   said first support means further comprising a first crossbearer extending from sill to sill and being supported at each sill by said brackets.

9. The invention according to claim 8; and
   said second and third container support means further comprising second and third crossbearers, said second and third crossbearers being connected to said sill with sandwich brackets spaced inward from the ends of the railway car.

10. A railway car with side walls having bottom portions and end structures defining a well for carrying containers of selected length within the well, said containers having inner and outer ends, said car comprising;
    side sills having connection to the bottom portions of the walls and having interiorly projecting flanges;

a center crossbearer extending between opposed side sill flanges for supporting the inner ends of containers carried in tandem in the well;

an inner "L" shaped bracket with first upper and first horizontal portions connected to the sill above and inside the sill;

an outer "L" shaped bracket, with second upper and second horizontal portions being connected to the sill below and outside the sill, the inner and outer brackets sandwiching the sill between them and the first horizontal portions and first vertical portions being in part substantially wider than the second horizontal portions and second vertical portions for improved load distributions to the sill and wall.

11. The invention according to claim 10, and said sill to side wall connection further comprising a side sheet forming an exterior part of the side wall and having an upper vertical portion and a lower inwardly angled portion; the inwardly angled portion terminating in an inwardly horizontally extending flange;

said side sill being a "Z" section member, with a top flange, bottom flange and web between the sill top and bottom flanges, being connected to the side wall whereby the top flange is fixed to and extends inward from said sheet, merges, into the web and then merges into said lower flange;

said side sheet horizontally extending flange being fixed to the outer bracket thereby forming a trapezoidal box section; and a bracing plate captive within said box section.

12. The invention according to claim 11; and said crossbearer being a tube formed of a crossbearer plate fixed to a crossbearer channel, and said plate forming a well interior container-support surface through connection with two opposed interior brackets.

13. The invention according to claim 12; and intermediate cross bearers extending between the side sills and being spaced between the center crossbearer and each of said end structures, the intermediate cross bearers being positioned to support the ends of a container of a length substantially less than the length of the well.

14. The invention according to claim 13; and longitudinal stringers parallel to the side sills joining the end structures and crossbearers and forming therewith an open grid defining the bottom of the well.

* * * * *